United States Patent [19]
Adams

[11] Patent Number: 5,255,182
[45] Date of Patent: Oct. 19, 1993

[54] PAYMENT CARD POINT-OF-SALE SERVICE QUALITY MONITORING SYSTEM, APPARATUS, AND METHOD

[75] Inventor: Carl A. Adams, San Francisco, Calif.

[73] Assignee: Visa International Service Association, San Francisco, Calif.

[21] Appl. No.: 828,409

[22] Filed: Jan. 31, 1992

[51] Int. Cl.$^5$ ............................................. G07G 1/12
[52] U.S. Cl. .................................. 364/405; 371/16.1; 379/379; 379/380
[58] Field of Search ...................... 364/405, 264, 264.4, 364/266; 371/20.1, 15.1, 16.1; 379/91; 235/380, 381, 379

[56] References Cited

U.S. PATENT DOCUMENTS

| | | | |
|---|---|---|---|
| 4,569,042 | 2/1986 | Larson | 370/30 |
| 4,750,175 | 6/1988 | Brennehan et al. | 371/22 |
| 4,894,823 | 1/1990 | Adelmann et al. | 370/60 |

Primary Examiner—Roy N. Envall, Jr.
Assistant Examiner—Ari M. Bai
Attorney, Agent, or Firm—Heller, Ehrman, White & McAuliffe

[57] ABSTRACT

A system for determining the cause of lost, delayed or erroneous responses in a network for authorizing payment card transactions from the point of view of the point-of-sale terminal that forms part of the network. A request for authorization is entered into the terminal, the terminal transmits a message requesting authorization to a computer in the network, and receives a return message in response from the computer. The terminal logs the origination time of the message, the elapsed time between the origination time and the time at which it receives the return message, the transaction serial number, and, optionally, other data for each request for authorization. In a variation, each computer in the network adds a time stamp to the message as the message returns from the computer to the terminal. The time stamp shows the computer elapsed time, computer identity, authorization status, etc. The terminal additionally logs the time stamps received in the return message. In a further variation, each computer in the network adds a time stamp to the message each time the computer processes the message. The computer time stamp shows the computer transit time instead of the computer elapsed time. In all variations, the terminal uploads the logged data from time-to-time for analysis, preferably by a computer in the network.

89 Claims, 3 Drawing Sheets

PAYMENT CARD POINT-OF-SALE SERVICE QUALITY MONITORING SYSTEM, APPARATUS, AND METHOD

BACKGROUND OF THE INVENTION

The subject invention relates to a system for approving authorization requests made by a merchant regarding the credit worthiness or solvency of a holder of a payment card. More particularly, a new system is disclosed in which the issuer of payment cards can monitor the quality of service provided to the payment card user when a request for authorization is transmitted from a merchant's point-of-sale terminal to the issuer for approval. The new system enables the issuer to monitor the network of computers that provides the transaction authorization system, to identify the weaknesses in the system that cause a lost, delayed, or erroneous response to a request for authorization of a transaction, and to correct those weaknesses.

In recent years, the use of payment cards to facilitate purchases without cash has been widespread. In a typical payment card system, a potential cardholder applies to an institution, often a bank, for a card. The institution, called the issuer, will provide a payment card to the potential cardholder if he/she meets certain financial requirements. The issuer then opens a file having account information on the cardholder. This file is continually updated and supplied with data concerning recent purchases and payments. As will be discussed below, the file kept on each cardholder is used to determine whether a particular transaction should be approved. The payment card can be used as a means for extending credit (credit card), or for debiting a deposit account funded by the cardholder (debit card).

The cardholder may purchase goods in any establishment which accepts the cardholder's particular card. Each establishment, which will be referred to as the merchant, is generally associated with an intermediate institution. The intermediate institution, which will be referred to as the merchant member bank, is responsible for enlisting various merchants to accept the particular credit card for purchases.

In use, the cardholder presents the card to the merchant for payment of either goods or services. The merchant forwards a draft of the transaction to the merchant member bank for payment, less a service charge. The merchant member bank in turn, presents the draft to the issuer bank for payment, less a service charge. The issuer bank then bills the cardholder for the transaction amount. Alternatively, the cardholder can maintain an account at the issuer bank, and can have a debit card arrangement whereby the account can be debited by the issuer either at the time of the transaction or when the merchant member bank supplies the draft for payment.

Typically, the presentation of the draft and the payment by the issuer is accomplished electronically through a linked computer network. A data control center is used to transfer funds electronically. The data control center is electronically connected to a plurality of issuers and also to a plurality of merchant member banks. Information passing between merchant member banks and issuers is routed through the data control center.

As can be appreciated, any funds transfer system must be protected in a variety of ways from credit and fraud losses. Thus, safeguards are typically provided to limit the use of lost or stolen payment cards. Further, the system usually includes methods for limiting the amount of purchases a cardholder is allowed to make in a given period of time. Even with protection, credit and fraud losses amount to hundreds of millions of dollars per year to the parties involved in the system.

Although some older loss prevention systems, such as the printed bulletin, in which the merchant checks the cardholder's account number against a printed list, and the voice authorization, in which the merchant calls the member merchant bank and asks for approval to charge the transaction amount to the cardholder's account, are still in use, more than 70% of payment card transactions in the United States originate from an electronic point-of-sale terminal. The merchant enters the payment card number, the transaction type and the transaction amount and other required data into the point-of-sale terminal. More commonly, the point-of-sale terminal reads the payment card number directly from the payment card. The point-of-sale terminal then electronically forwards a message requesting authorization to the merchant member bank.

If the merchant member bank is, in fact, the issuer of the particular bank card, the message requesting authorization can be handled internally. More particularly, the merchant member bank's computer checks its account file for the cardholder and decides to grant or deny authorization of the transaction. In most cases however, the issuer of the card is different from the merchant member bank. In this situation, the merchant member bank computer electronically routes the request for authorization to the data control center. The data control center then forwards the message to the issuer of the payment card. The remote issuer's computer checks its account file on the cardholder to determine if the card has been reported lost or stolen, or if the customer has exceeded his/her credit limits, or has depleted the funds in his/her deposit account. The issuer then transmits a return message, either granting or denying authorization of the transaction, back to the merchant through the data control center and the merchant's merchant member bank.

The network just described is an over simplification: present commercial networks typically include additional computers, such as a computer in the store, a computer in the store's data processing center, and various switching and distribution computers between the store and the member merchant bank's computer, between the member merchant bank's computer and the data control center, and between the data control center and the issuer's computer. The various computers are often separated by thousands of miles and are interconnected by dial-up or dedicated communication links.

Card issuers desire to approve as many payment transactions as possible, given the amount of available credit, and to provide approval of a transaction within a few seconds. The card holder also wants to have the transaction approved quickly. Yet, the long and complicated paths through which the message requesting authorization flows offer many opportunities for error, loss, and delay. For instance, it takes several seconds to establish a dial-up communication link, and there may be insufficient dial-up or dedicated circuits to handle the load at peak hours, which adds additional delays. Each computer through which the message passes adds several seconds processing time, and the processing time increases at peak times as the computers reach their capacity limits. The computers in the network are subject to hardware failures, and are subject to software errors.

The transaction authorization network is set up to prevent the merchant and cardholder from waiting for approval for more than a specified time by providing some of the computers in the network with a time-out facility. If such a computer transmits a message requesting authorization towards the issuer's computer and does not receive a message in response within a certain time, the computer generates its own response that it transmits back towards the point-of-sale terminal. Such a response is less satisfactory than a response generated by the issuer's computer: the response may falsely deny authorization of the transaction, which is unsatisfactory to the merchant and the cardholder, or it may falsely grant authorization of the transaction, which is unsatisfactory because it increases the risk to the merchant and to the issuer. Alternatively, it may ask the merchant to telephone the merchant member bank, which further delays authorization of the transaction. The merchant can also impose its own time-out by cancelling the request for authorization and trying again. This adds to the load on the transaction authorization network.

The ability of the transaction authorization network to provide timely and accurate responses can be improved by adding necessary capacity to the network, or by, for instance, changing from a dial-up communications link to a dedicated link, but such improvements are expensive and should be added only where they are necessary. The invention is concerned with providing a system for monitoring the quality of service provided by the transaction authorization network from the point of view of the point of sale, i.e., the cardholder and the merchant, to determine where in the network the messages requesting authorization become delayed, lost or erroneous.

The part of the transaction authorization network between the data control center and the issuers' computers is already fitted with a quality monitoring system. Each request for approval message includes the number of the payment card. The computer in the data control center logs the payment card number and the time at which data control center computer transmits the message requesting authorization to the issuer's computer. The data control center computer monitors the return messages coming in from the issuers, identifies the payment card number, and logs the time at which the message pertaining to that payment card was received from its issuer. The log of transmit and receive times stored in the data control center can be later analyzed to determine which issuers are tardy in responding to the data control center. The data control center computer also monitors the log so that it can provide a response to the point-of-sale terminal if the issuer does not respond within a specified time.

The present monitoring system only monitors part of the network and so cannot give an accurate picture of how well the transaction authorization network works from the point of view of the point of sale. Moreover, the present monitoring system cannot account for messages that originate at the point of sale but, due to a network defect, never reach the data control center. At present, the issuers' only view of the network from the point of sale is obtained indirectly through the complaints of cardholders. This is unsatisfactory in several respects. Cardholder complaints allow problems to go undetected. A problem may affect the transactions of several issuers, but since each issuer has no knowledge of another issuer's problems, the issuer may dismiss the complaints as unrelated events, and not worthy of corrective action. Cardholder complaints provide no consistent basis for diagnosing problems. The cardholder who receives an incorrect denial of authorization is much more likely to complain than the cardholder who receives an incorrect grant of authorization, or whose grant of authorization is merely delayed. Cardholder complaints provide no way of quantifying the performance of the transaction authorization network from the point of sale. Issuers may desire that 99% of all transactions be completed at the point of sale within 25 seconds with a 99.9% accuracy, but there is no way of determining whether this goal is being met. Without knowledge of how well the network is performing, the need for improvements is hard to determine.

SUMMARY OF THE INVENTION

In the following description of the invention, a transaction authorization network comprises a point-of-sale terminal connected through a communication link to a chain of computers connected by communication links, the computers including at least a data control center and an issuer's computer. The point-of-sale terminal and computers each constitute a node in the transation authorization network. The invention provides for monitoring the quality of the transaction authorization network from the point of view of the point of sale from the origination by the point-of-sale terminal of a message requesting authorization of a transaction to the receipt by the terminal of a message granting or denying authorization, or cancellation of the request. The point-of-sale terminal gathers and stores for later analysis timing and result data pertaining to each message requesting authorization that the terminal attempts to transmit.

In a first embodiment of the service quality monitoring system according to the invention, the point-of-sale terminal measures and logs the terminal elapsed time for each message requesting authorization of a transaction that the terminal attempts to transmit, irrespective of whether the terminal receives a response to the message from the transaction authorization network. The terminal elapsed time for a message requesting authorization is the time required for the terminal to receive a message in response to the message requesting authorization, and is preferably the time that elapses between the origination time and the receive time. The origination time is preferably the time at which the point-of-sale terminal begins to establish communication with the computer to which it is connected so that it can transmit a message requesting authorization. The receive time is the time at which the terminal receives the return message back from the computer to which it is connected. Alternatively, the terminal can log data from which the terminal elapsed time can be calculated. The point-of-sale terminal preferably additionally logs the origination time of each message. Optionally, the terminal can also log a message identifier, such as the transaction serial number or the payment card number for each message it attempts to send, and the authorization status data in the return message.

The terminal from time-to-time uploads its logged data for analysis. This is preferably done in response to a command issued by a computer in the transaction authorization network, and the data is preferably uploaded to a computer in the network. From the logged data, the total time required by the transaction authorization network to authorize each transaction entered into the point-of-sale terminal, and the number of requests for authorization that are not responded to, can be determined. By combining the data from a number of point-of-sale terminals, and/or by correlating the data logged by the point-of-sale terminal with data logged elsewhere in the transaction authorization network, e.g., the computer of the issuer, the number of requests for authorization that receive an erroneous response, and the cause of delays and/or errors, may be determined. The first embodiment of the service quality monitoring system does not allow errors and the cause of delays and/or errors to be determined directly, however.

A second embodiment of the service quality monitoring system according to the invention gathers more detailed information about the service quality provided by the transaction authorization network by applying the principles of the first embodiment of the invention to each computer, or selected computers, in the transaction authorization network. The additional data enables the part of the network causing delayed, lost, or inaccurate messages to be determined more directly. For each message requesting authorization, each computer in the network measures a computer elapsed time. The computer elapsed time is the time that elapses between the time at which the computer receives the message from the previous node in the network, and the time at which the computer transmits the message back to the previous node in the network. Instead of logging the computer elapsed time, the computer adds a computer time stamp to the message, the computer time stamp becoming part of the message. The computer time stamp includes the computer elapsed time, and preferably also includes identity data identifying the computer, and an action code, indicating what the computer did with the message (e.g., a "forwarded authorization request" code, or an "issued transaction approved" code, etc.).

In addition to measuring and logging the terminal elapsed time, the terminal in the second embodiment of the invention generates a terminal time stamp for each message requesting authorization of a transaction that the point-of-sale terminal attempts to transmit. The terminal preferably logs at least part of the terminal time stamp, and preferably adds at least part of the terminal time stamp to the message, the terminal time stamp becoming part of the message. The terminal time stamp preferably includes a message identifier, such as a transaction serial number or the payment card number. The terminal time stamp can also include other data relating to the terminal's transmission of the message.

When the point-of-sale terminal receives the return message, it adds a final time stamp that includes the terminal elapsed time to the message and logs the time stamps in the message. The final time stamp preferably also includes an action code indicating what the terminal did with the message, e.g., a "transaction authorized received" code. If the terminal does not receive a return message it logs only a final time stamp indicating the terminal elapsed time and, preferably, an action code, e.g., a code indicating "request for authorization abandoned-time out". The terminal logs all data pertaining to each message such that it can readily be linked together for analysis.

As in the first embodiment of the invention, the terminal from time-to-time uploads its logged data for analysis. This is preferably done in response to a command issued by a computer in the transaction authorization network, and the data is preferably uploaded to a computer in the network. Additionally, the time stamps in the message can be logged at other nodes in the transaction authorization network. By comparing the logged data from the point-of-sale terminal and the logged data from other nodes in the transaction authorization network, the node or nodes of the network causing lost or erroneous messages can be determined.

The third embodiment of the service quality monitoring system according to the invention is a variation on the second embodiment that provides an even more detailed picture of the quality of service provided by the transaction authorization network. In the third embodiment of the invention, each computer, or selected computers, in the network adds a computer time stamp to the message each time the message passes through the computer. Thus, a computer adds a computer time stamp to the message both when the message is travelling from the point-of-sale terminal to the issuer's computer and when the message is travelling from the issuer's computer back to the point-of-sale terminal. Each computer time stamp includes the computer transit time instead of the computer elapsed time used in the second embodiment. The computer transit time which is the time that elapses between the time at which the computer receives the message from the previous node in the network and the time at which the computer passes the message on to the next node in the network. Alternatively, the computer time stamp can include time data that enables the computer transit time to be calculated.

The point-of-sale terminal in the third embodiment of the service quality system according to the invention is similar to that in the second embodiment.

Like the terminal in the other two embodiments, the point-of-sale terminal in the third embodiment from time-to-time uploads its logged data for analysis. This is preferably done in response to a command issued by a computer in the transaction authorization network, and the data is preferably uploaded to a computer in the network.

DETAILED DESCRIPTION OF THE INVENTION

Figure 1:
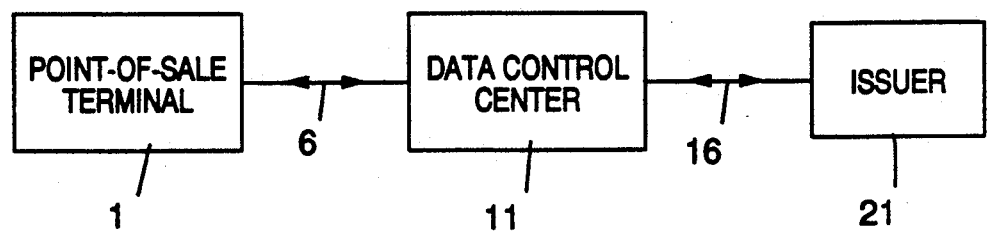
FIG. 1 is a block diagram of a simplified transaction authorization network to which the service quality monitoring system according to the invention is applied.

FIG. 1 shows a block diagram of a basic transaction authorization network having three nodes, the point-ofsale terminal 1, the data control center 11, and the computer of the issuer 21. The nodes of the network are connected in a chain by the communication links 6 and 16. The point-of-sale terminal 1 is one of a plurality of point-of-sale terminals (not shown) connected through dial-up or dedicated communication links to the data control center 11. The point-of-sale terminal 1 is connected to the data control center 11 through the communication link 6. The data control center 11 has several functions in providing cashless transactions: only its role in the transaction authorization process will be described here. The data control center 11 is also connected through dial-up or dedicated communication links to the computers of a plurality of issuers (not shown). The computer of one issuer 21 is shown in FIG. 1. The computer of the issuer 21 is connected via the communication link 16 to the data control center 11.

The computer of the issuer 21 keeps records of the accounts of cardholders holding payment cards issued by the issuer 21. The cardholder records indicate if the card has been reported lost or stolen, or if the cardholder has exceeded his/her credit limits or has depleted the funds in his/her deposit account, or if the cardholder is delinquent in making payments.

In a typical transaction authorization procedure, a cardholder holding a payment card issued by the issuer 21 makes a purchase and presents his/her card to the merchant in payment. The merchant enters the payment card number, the transaction amount, and possibly other required data into the point-of-sale terminal 1. The payment card number may be entered by the merchant from a keyboard, but it is more usually read by the point-of-sale terminal directly from the payment card. The transaction amount can be entered from a keyboard, or may be electronically fed into the point-of-sale terminal from a cash register or similar device.

The point-of-sale terminal 1 establishes communication with the data control center 11 and transmits a message requesting authorization of the transaction. The message includes the data that has been entered into the terminal, together with additional information stored in the point-of-sale terminal 1, such as the identity of the merchant and the identity of the point-of-sale terminal 1. The data control center 11 receives the message and temporarily stores it. The data control center 11 also logs the message and the time at which it received the message. The data control center 11 reads the payment card number in the message, and determines the identity of the issuer that issued a payment card with that number. In the example being described, the issuer that issued the card is issuer 21. The data control center establishes communication with the computer of the issuer 21 and, when cleared to do so by the issuer's computer, forwards the message received from the point-of-sale terminal 1.

The computer of the issuer 21 reads the payment card number and transaction amount information in the message and checks its account record for the payment card with that number. From the data in the account record and the transaction amount data in the message, the issuer's computer approves or denies the transaction. The computer of the issuer 21 adds authorization status data to the message and transmits the message including the authorization status data back to the data control center 11. Alternatively, the computer of the issuer 21 can generate a completely new message including the approval status information. Either form of message transmitted by the computer of the issuer 21 must include terminal identity data to inform the data control center of the identity of the point-of-sale terminal that sent the message to the data control center, and to which the data control center must return the message.

The data control center 11 receives the message from the issuer 21 and temporarily stores it. The data control center reads the terminal identity data in the message and determines to which point-of-sale terminal it is to return the message. In the example shown in FIG. 1, the data control center 11 transmits the message back to the point-of-sale terminal 1 via the communication link 6. The message that the point-of-sale terminal 1 receives from the data control center 11 will be called the "return message."

The data control center 11 also reviews its log of incoming messages from time to time. If the present time exceeds the logged time for the message by a predetermined time out time, and the data control center has not received a message from the computer of the issuer 21, the data control center will generate its own message and transmit it to the point-of-sale terminal 1. As explained above, a message generated by the data control center is less likely to be a satisfactory one than a message generated by the issuer 21.

In this simple network, the point-of-sale terminal remains on line awaiting the message to return from the data control center 11, and can receive the message immediately. In a more complex network, the point-of-sale terminal 1 may be receiving other messages, and the data control center may have to wait until it receives a go-ahead signal from the point-of-sale terminal before it can transmit the message. The data control center transmits the message to the point-of-sale terminal, the point-of-sale terminal reads the authorization status information in the return message received from the data control center, and may display it to the merchant or, assuming the transaction is approved, proceed with printing a voucher for the cardholder to sign, completing the transaction.

Figure 2:
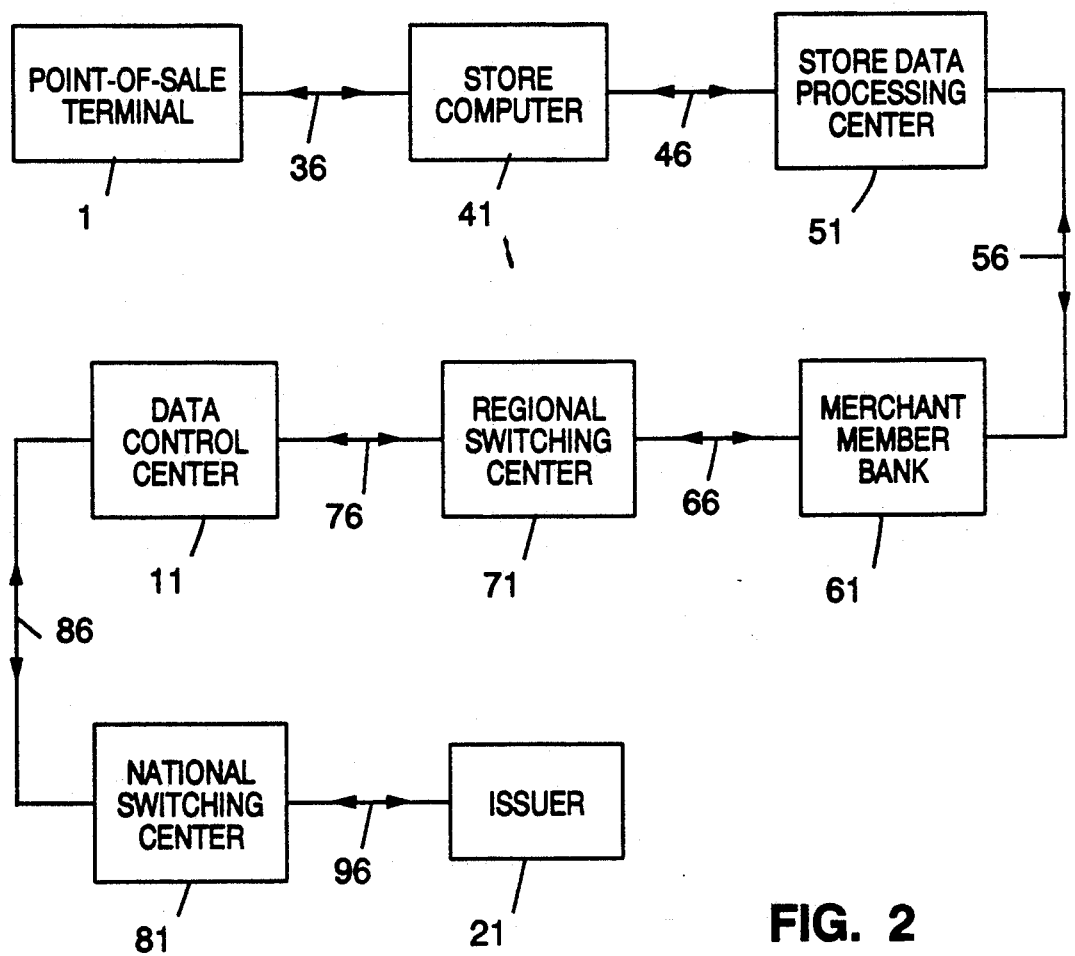
FIG. 2 is a block diagram of a more typical transaction authorization network to which the service quality monitoring system according to the invention is applied.

FIG. 2 shows a more typical transaction authorization network having eight nodes connected in a chain by communication links. The point-of-sale terminal is connected by the data link 36 to the in-store computer 41. The in-store computer 41 is connected by the data link 46 to the store's regional or national data processing center 51. The store's data processing center is connected by the data link 56 to the merchant member bank's computer 61. The merchant member bank's computer 61 is connected via the data links 66 and 76, and the regional switching computer 71, to the data control center 11. The data control center 11 is connected to the computer of the issuer 21 via data links 86 and 96 and the national switching computer 81. To obtain authorization of a transaction, the point-of-sale terminal 1 sends a message though this network to the computer of the issuer 21 and the computer of the issuer 21 sends the return message back through the same network to the point-of-sale terminal 1. In some systems the message may return to the point-of-sale terminal through a different network of comparable complexity.

The following descriptions of the various embodiments of the invention will refer to the simple transaction authorization network of FIG. 1. The descriptions can readily be adapted to a more complex network, such as that shown in FIG. 2.

In a service quality monitoring system according to the first embodiment of the invention, the point-of-sale terminal 1 measures and logs for later analysis the terminal elapsed time for each message requesting authorization of a transaction that the terminal attempts to transmit, irrespective of whether the point-of-sale terminal receives a response to message. The terminal elapsed time is preferably the time that elapses between the origination time and the receipt time of the message. The origination time is preferably the time at which the point-of-sale terminal 1 begins to establish communication with the data control center 11 so that it can transmit the message requesting authorization, but it can be the time at which the terminal begins to transmit the message, or it can be some other time relevant to the transmission of the message. The receipt time is the time at which the terminal receives the corresponding return message. If the point-of-sale terminal does not receive a return message, the receipt time is the time at which the merchant cancels the request for authorization, or the point-of-sale terminal automatically applies a time out and cancels the request for authorization itself. In the following description, the terminal receiving a return message will be understood to include the request for authorization being cancelled, either by the merchant or by the point-of-sale terminal.

For each message requesting authorization of a transaction entered into the point-of-sale terminal 1 that the terminal attempts to transmit, the terminal begins to measure the terminal elapsed time at the origination time of the message, and preferably also logs the origination time of the message. In a simple point-of-sale terminal that deals with one request for authorization at a time, the terminal stops measuring the terminal elapsed time when it receives the return message, and logs the terminal elapsed time. The terminal logs the terminal elapsed time in such a way that it can readily be linked with the already-logged origination time of the same message. Hardware and/or computer software for measuring the terminal elapsed time and for generating data indicating the origination time and the receipt time, and for logging and linking such data is well known and will not be discussed further.

In a more complex version of the point-of-sale terminal 1 that handles more than one request for authorization at a time, for each message requesting authorization of a transaction entered into the point-of-sale terminal 1 that the terminal attempts to transmit, the terminal begins to measure the terminal elapsed time at the origination time of the message. The terminal also adds a message identifier to the message and logs the message identifier in such a way that it can be readily linked with the terminal elapsed time of the message. The terminal also preferably logs the origination time of the message in such a way that it can readily be linked to the message identifier for the message. The message identifier, which is preferably the transaction serial number, but could be the payment card number, remains a part of the message throughout the message's passage through the transaction authorization network. The terminal preferably applies the same message identifier to all attempts to obtain approval of the same transaction, i.e., to transactions with the same payment card number and transaction amount. Alternatively, the terminal can log a flag indicating second and subsequent attempts to obtain approval of the same transaction when the same payment card number and transaction amount are entered two or more times in succession. A message identifier can also be included in the message transmitted by the simple form of the terminal described above.

When the terminal receives a return message, it reads the message identifier in the return message, stops measuring the terminal elapsed time for that message, and logs the terminal elapsed time. The terminal logs the terminal elapsed time of each return message in such a way that the terminal elapsed time can readily be linked with the message identifier and origination time of the same message, i.e., the message that has the same message identifier as the message identifier read in the return message.

The simple and more complex point-of-sale terminals according to the first aspect of the invention can also have several options according to the invention: the point-of-sale terminal 1 can read the authorization status data in the return message, and log that data in such a way that it can be readily linked to other logged data pertaining to same the message. If the point-of-sale terminal logs the authorization status data, it is preferable that the terminal and other nodes in the transaction authorization network also log the message identifier. Logging the message identifier enables the authorization status data stored in the terminal 1 to be later correlated with the authorization status data logged at other nodes in the network, such as the computer of the issuer 21, to detect errors in the authorization status data received by the terminal 1.

The point-of-sale terminal 1 can log additional time data relating to the terminal's transmission of a message as well as the origination and receipt times. If, for instance, the origination time is the time at which the terminal begins to establish communication with the data control center 11 so that it can transmit the message, the terminal can additionally log the terminal transit time. The terminal transit time is the time that elapses between the origination time and the time at which the terminal transmits the message, and indicates the time required for the terminal to establish communication with the data control center, and for the data control center to give the go-ahead for the terminal to transmit the message. The terminal 1 logs the additional time data such that it can be readily linked with the already-logged data for the same message.

If the transaction approval network takes too long to respond to a request for authorization, and the merchant cancels the request, or the point-of-sale terminal 1 automatically cancels the request, the terminal can log a "cancelled" code indicating that the request was cancelled. The terminal logs this code in such a way that it can be readily linked with the origination time for the same message. The cancelled code is preferably logged as the return message authorization status data, in addition to the terminal elapsed time. Alternatively, the terminal can log the cancelled code instead of the terminal elapsed time. Different codes can be sued to insidcate a merchant cancellation and a time out cancellation caused by the terminal. Logging data in the point-of-sale terminal regarding cancelled messages enables the number of requests for authorization that are not responded to by the transaction authorization network to be determined. Correlating this data with data logged at other nodes in the transaction authorization network enables the part of the network responsible for the lack of a response to be determined.

Instead of measuring and logging elapsed times, such as the terminal elapsed time and the terminal transit time, the terminal can log suitable absolute times, such as the origination time (an absolute time), the absolute receive time and the absolute transmit time. Logging these absolute times is the same as measuring and logging the elapsed times of interest, i.e., the terminal elapsed time and the terminal transit time, because the elapsed times of interest can be calculated from the absolute times when the logged data is analyzed.

A computer in the transaction authorization network, such as the data control center 11, transmits a command to the point-of-sale terminal 1 from time-to-time instructing the terminal to upload its log to a computer in the network for analysis. On receiving the upload command, the terminal 1 transfers the contents of its log via the communication link 6 and the network to at least one other computer in the network. Alternatively, the terminal 1 can be programmed to upload its data spontaneously after a preset time interval or after a preset number of transactions. As a further alternative, the terminal 1 can store its logged data on a removable storage medium, such as a magnetic tape or disk, and its logged data can be uploaded by removing the removable medium from time-to-time and transporting it to a central location for analysis.

The uploaded data is preferably framed for analysis so that each data frame includes the data for one attempt by the point-of-sale terminal to transmit a message requesting authorization of a transaction, irrespective of whether the terminal successfully transmits the message, and irrespective of whether the terminal receives a response to the message. The data frame contains at least one data field: the terminal elapsed time for the attempt. The terminal elapsed time indicates the total time required by the transaction authorization network to process the request for authorization and to return its response to the terminal, or for the request for authorization to be cancelled at the terminal.

The data frame for an attempt at transmitting a message may contain additional data fields such as the origination time, the message identifier, the payment card number, the terminal transit time, authorization status, and abandoned/cancelled code. Preferably the data frame includes the terminal elapsed time, the origination time, the message identifier, and the authorization status data. Including the payment card number in the logged data enables data frames following the data frame indicating an abandoned or cancelled attempt to be checked to see if another attempt to obtain authorization of the transaction was made. However, identifying multiple attempts to obtain authorization of the same transaction is preferably done automatically by the terminal, as described above.

Logging a message identifier that remains a part of the message throughout the message's passage through the transaction authorization network enables data logged by the point-of-sale terminal 1 to be correlated with data that includes the message identifier logged at other nodes in the network. Such other logs can include data from the log of the existing service quality management system based on the data control center 11, and the log of transaction requests kept by the computer of the issuer 21. Correlating data logged by the point-of-sale terminal with data logged by other parts of the transaction authorization network enables errors in the return message received by the point-of-sale terminal to be detected, and enables the part of the network responsible for delayed, lost or erroneous responses to be determined.

The first embodiment of the point-of-sale terminal-based service quality monitoring system described above has an ability to measure the quality of the service provided at a given point-of-sale terminal, and a somewhat limited ability, dependent on correlating data from different parts of the transaction authorization network, to determine the part of the network causing delayed, lost, or erroneous responses.

The second embodiment of a service quality monitoring system according to the invention gathers additional data relating to the quality of service provided by the transaction authorization network by applying the principles of the first embodiment of the invention to the computers, or selected computers, in the network. The additional data enables the part of the network causing delayed, lost, or inaccurate messages to be determined.

For each message requesting authorization passing through the transaction authorization network, each computer, such as the data control center 11 and the computer of the issuer 21, measures a computer elapsed time. The computer elapsed time is the time that elapses between the time at which the computer receives the message from the previous node in the network, and the time at which the computer transmits the message back to the previous node in the network. For example, the data control center 11 receives a message from the point-of-sale terminal 1 at 10:00:00 hrs, but does not determine the identity of the issuer 21 of the payment card until 10:00:07. The data control center then immediately attempts to forward the message to the issuer institution 21, but the issuer's computer is busy and does not give the go-ahead to transmit the message until 10:00:10. The data control center 11 receives the message back from the issuer's computer at 10:00:12. The point-of-sale terminal is busy and does not give the data control center the go-ahead to transmit the message back to it until 10:00:18. The computer elapsed time for the data control center is 18 seconds, from 10:00:00 to 10:00:18. The computer elapsed time for the computer of the issuer 21 is 2 seconds, from 10:00:10 to 10:00:12.

Each computer adds a computer time stamp to the message, the computer time stamp becoming part of the message. The computer time stamp added by each computer includes the computer elapsed time measured by that computer. Each computer adds a computer time stamp to the message only when the message is travelling from the computer of the issuer 21 back to the point-of-sale terminal 1. This is because no computer elapsed time data is available when the message is travelling from the terminal 1 to the computer of the issuer 21. The computer time stamp preferably also includes identity data identifying the computer, and an action code, indicating what the computer did with the message (e.g., a "forwarded an authorization request" code, or a "issued transaction approved" code, etc.).

As in the first embodiment of the invention, the point-of-sale terminal 1 in the second embodiment of the invention measures and logs the terminal elapsed time for each message requesting authorization of a transaction entered into the terminal that the terminal attempts to transmit. The terminal measures and logs the terminal elapsed time irrespective of whether the terminal successfully transmits the message, and irrespective of whether the terminal receives a response to the message. Additionally, the terminal 1 generates data, called "terminal time stamp data," regarding each request for authorization message it originates. The terminal also logs at least part of the terminal time stamp data. This provides a record of each attempt by the terminal to transmit a message requesting authorization. The terminal 1 also adds a terminal time stamp to the message, the time stamp becoming part of the message. Preferably, the terminal time stamp added to the message includes at least part of the terminal time stamp data relating to the message.

The terminal time stamp data includes terminal time data, preferably also includes the transaction serial number, and may include a point-of-sale terminal identification code, a action code indicating what action the terminal had taken (e.g., an "authorization request initiated" code), and/or other information relating to the transaction or to the point-of-sale terminal. The terminal preferably recognizes second and subsequent attempts to transmit a message requesting authorization of the same transaction and does not advance the transaction serial number when it determines that consecutive messages relate to the same transaction. The terminal thus applies the same transaction serial number to all attempts to transmit messages relating to the same transaction. When the logged data is later analyzed, this enables multiple attempts to obtain authorization of the same transaction, and the logged data relating to the unsuccessful attempts, to be easily identified.

The terminal time data preferably includes the preferred origination time, i.e., the time at which the point-of-sale terminal 1 begins to establish communication with the data control center 11 so that it can transmit the message. The terminal time data may additionally include the terminal transit time, which is the elapsed time between preferred origination time and the time at which the terminal transmits the message. The terminal transit time indicates the time required for the point-of-sale terminal 1 to successfully establish communication with the data control center 11. Measuring the terminal transit time is not essential, because it can be calculated from the terminal elapsed time and the computer elapsed time of the computer to which the terminal is connected. However, measuring and logging the terminal transit time gives a useful cross-check on the other data. Alternatively or additionally, the terminal time data may include other time data relating to the point-of-sale terminal's transmission of the message and/or communication between the point-of-sale terminal 1 and the data control center 11.

In the preferred embodiment, the point-of-sale terminal 1 generates and logs as terminal time stamp data the transaction serial number and the origination time of the message. The terminal time stamp added to the message by the terminal 1 includes only the transaction serial number, however.

When the point-of-sale terminal 1 receives the return message from the data control center 11, it stops measuring the terminal elapsed time and logs the time stamps in the return message that were added to the message by the computers in the network (the data control center 11 and the computer of the issuer 21) and by the point-of-sale terminal 1. The point-of-sale terminal 1 logs the time stamps in the return message so that they can readily be linked with the already-logged terminal time stamp data for the same message.

The point-of-sale terminal 1 preferably additionally generates a final time stamp when it receives the return message. The final time stamp includes the terminal elapsed time, and can also include additional data such as an action code (e.g., a "received transaction authorized" code), and/or additional data relating to the point-of-sale terminal's processing of the return message. The action code in the final time stamp can indicate that no return message was received within a the terminal's time out time, or that the merchant cancelled the request for authorization. To generate the action code in the final time stamp, the terminal 1 reads the authorization status data in the return message.

The point-of-sale terminal 1 preferably adds the final time stamp to the return message, and logs the final time stamp together with the other time stamps in the return message. Alternatively, the terminal can log the final time stamp directly such that the final time stamp can readily be linked with other logged time stamps relating to the same message.

Known data compression techniques may be used to reduce the number of bits needed to transmit and store the time stamps. Checksum data may be added to each time stamp and/or to the set of time stamps or other error correction codes may be used to ensure data integrity. Techniques for generating the terminal time stamp data, the terminal time stamp, and the computer time stamp, for adding time stamps to a message, and for logging and linking time stamps using hardware and/or using computer software routines are known and will not be discussed.

Elapsed times are preferably measured and logged because they save having to establish synchronous clocks throughout the network. Alternatively, if the network has or can have synchronous clocks, suitable absolute times can be logged for the terminal time stamp data and the computer time data in the computer time stamps. Logging absolute times is the same as measuring and logging elapsed times because an elapsed time can easily be calculated from two appropriate absolute times when the logged data is analyzed.

As in the first embodiment of the invention, the point-of-sale terminal 1 receives a command from a computer in the transaction authorization network from time-to-time instructing it to upload its logged time stamps for analysis. The terminal 1 can upload its data to the data control center 11, or to any other computer in the network. Alternatively, the terminal 1 can be programmed to upload its data spontaneously after a preset time interval or after a preset number of transactions. As a further alternative, the point-of-sale terminal 1 can store its logged data on a removable storage medium, such as a magnetic tape or disk, and its logged data can be uploaded by removing the removable medium from time-to-time and transporting it to a central location for analysis.

Figure 3:
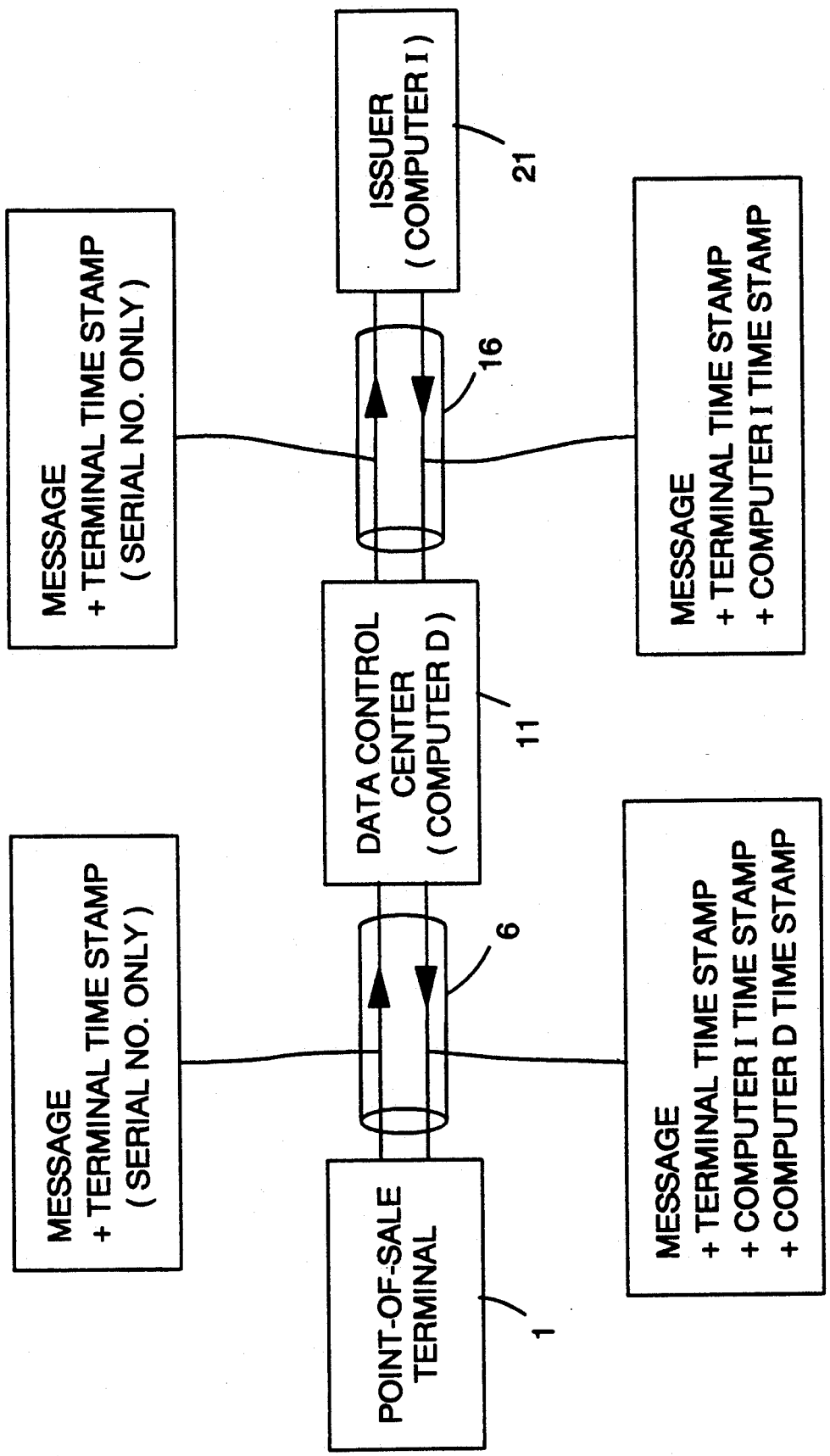
FIG. 3 is a block diagram of a simplified transaction authorization network to which the second embodiment of the service quality monitoring system according to the invention has been applied showing the time stamps added to the message at various points on the path of the message through the network.

FIG. 3 shows how the second embodiment of the invention is applied to the simple transaction authorization network shown in FIG. 1. The point-of-sale terminal 1 adds a terminal time stamp, consisting of the transaction serial number only, to the message, and transmits the message including the terminal time stamp to the data control center 11. When the data control center receives the message it logs the message and starts measuring the computer elapsed time for the message. The data control center 11 forwards the message to the issuer 21. The message still includes one time stamp. The computer of the issuer 21 receives the message, logs it and starts measuring the computer elapsed time for the message. The computer of the issuer processes the message, and adds its "Computer I" time stamp, which includes the computer elapsed time for the computer of the issuer, to the processed message when it transmits the processed message back to the data control center. The message now includes two time stamps.

When the data control center 11 can forward the message to the point-of-sale terminal 1, it stops measuring its computer elapsed time and adds its "Computer D" time stamp, which includes the computer elapsed time for data control center, to the message as it forwards the message to the point-of-sale terminal 1. The message now includes three time stamps. When the point-of-sale terminal receives the return message, it adds a final time stamp, which includes the terminal elapsed time, to the message and logs the time stamps in the return message.

Table 1 shows the time required by the various nodes in the transaction authorization network illustrated in FIG. 3 to process the message, and the elapsed times of the terminal, the data control center, and the computer of the issuer.

TABLE 1

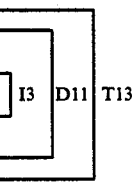

| Node | Action | Time (s) |
|---|---|---|
| 1. Terminal | communication | 2 |
| 2. Data control center | processing | 1 |
| 3. Data control center | communication | 2 |
| 4. Issuer | processing | 2 |
| 5. Issuer | communication | 1 |
| 6. Data control center | processing | 1 |
| 7. Data control center | communication | 4 |
| 8. Terminal | communication | 0 |

In table 1, the processing time is the time required for the node to process the message. In the data control center 11, this includes determining the identity of the issuer. In the computer of the issuer 21, this includes determining whether or not to authorize the transaction. The communication time is the time required to establish communication with the next node in the network, to wait for the goahead from the next node in the network to transmit the message, and to transmit the message. The elapsed time for the computer of the issuer is shown by the bracket marked "I3." "I" denotes the computer of the issuer, "3" is the computer elapsed time of 3 seconds. The computer elapsed time is made up of 2 seconds of processing time and 1 second of communication time. The elapsed time for the data control center is shown by the bracket marked "D11." "D" denotes the data control center, 11 is the computer elapsed time of 11 seconds. The computer elapsed time of the data control center is made up of 1 second processing time and 2 seconds of communication time when the data control center forwards the message from the point-of-sale terminal 1 to the computer of the issuer 21, 3 seconds for the computer elapsed time for the computer of the issuer 21, and 1 second of processing time and 4 seconds of communication time when the data control center forwards the return message from the computer of the issuer 21 to the point-of-sale terminal 1. The elapsed time of point-of-sale terminal 1 is shown by the bracket marked "T13." "T" indicates the point-of-sale terminal, 13 is the terminal elapsed time of 13 seconds. The terminal elapsed time is made up of 11 seconds of computer elapsed time for the data control center and 2 seconds of terminal communication time.

Table 2 illustrates how the second embodiment of the invention adds time stamps to the above message at the various points in the transaction authorization network shown in FIG. 3.

| | Time Stamp Part of Message | |
|---|---|---|
| Node | Serial | Time Data |
| 1. Terminal 1 | 1234 | |
| 2. Data Ctr 11 | 1234 | |
| 3. Issuer 21 | 1234 | I3ia |
| 4. Data Ctr 11 | 1234 | I3ia + D11fd |
| 5. Terminal 1 | 1234 | I3ia + D11fd + T13rd |
| 6. Terminal log | 1234 | 10:00:00 + I3ia + D11fd + T13rd |

In table 2, each letter-number-letter triplet is a time stamp. The first letter of the triplet indicates the node in the network that added the time stamp. The letter D denotes the data control center 11, the letter I designates the computer of the issuer 21, and the letter T designates the point-of-sale terminal 1. The number of the triplet indicates the elapsed time in seconds. The second and subsequent letters of the triplet are the action code.

After the transaction has been entered into the point-of-sale terminal 1, the point-of-sale terminal logs the terminal time stamp data, i.e., the transaction serial number (1234) and the origination time (10:00:00). The terminal 1 adds the transaction serial number to the message as the terminal time stamp, as shown in line 1 of table 2. The terminal begins to measure the terminal elapsed time and initiates communication with the data control center 11. After a communication time of 2 seconds (the terminal transit time) the terminal transmits the message to the data control center 11. When the terminal transmits the message to the data control center, the terminal elapsed time is 2 seconds.

When the data control center 11 receives the message from the point-of-sale terminal 1, it starts measuring its computer elapsed time for the message, processes the message, and forwards the message to the computer of the issuer 21. For the message shown in Table 1, this requires 3 seconds, 1 second of processing time and 2 seconds of communication time. When the data control center forwards the message to the computer of the issuer 21, the computer elapsed time for the data control center is 3 seconds, and the terminal elapsed time has increased by 3 seconds to 5 seconds.

When the computer of the issuer 21 receives the message from the data control center 11, it starts measuring its computer elapsed time for the message. When the computer of the issuer transmits the message to the data control center, it stops measuring its computer elapsed time for the message, and adds its computer time stamp to the message. For the message shown in Table 1, the computer elapsed time for the computer of the issuer is 3 seconds (2 seconds of processing time and 1 second of communication time). In the time stamp on line 3 of table 2, the letter I indicates that the time stamp was added by the computer of the issuer, the number 3 indicates that the computer elapsed time was 3 seconds, and letters ia indicate that the computer of the issuer issued a "transaction approved" code. When the computer of the issuer transmits the message to the data control center, the computer elapsed time for the data control center has increased by 3 seconds to 6 seconds, and the terminal elapsed time has increased by 3 seconds to 8 seconds.

The data control center 11 receives the message from the computer of the issuer 21, processes the message, and waits for some time before it can forward the message to the point-of-sale terminal 1. When the data control center forwards the message to the point-of-sale terminal, it stops measuring its computer elapsed time for the message and adds its computer time stamp to the message. For the message shown in Table 1, this requires 5 seconds, 1 second of processing time and 4 seconds of communication time. When the data control center forwards the return message to the point-of-sale terminal, the computer elapsed time for the data control center has increased by 5 seconds to 11 seconds. In the time stamp added to the message in line 4 of table 2, the letter D indicates that the time stamp was added by the data control center, the number 11 indicates that the terminal elapsed time was 11 seconds, and the letters fd show that the data control center 11 forwarded a "authorization denied" code, which is different from the code issued by the issuer. This indicates that an error has occurred at the data control center or in the data link between the issuer and the data control center. Also, when the data control center forwards the return message to the point-of-sale terminal, the terminal elapsed time has increased by 5 seconds to 13 seconds.

The point-of-sale terminal 1 receives the return message at substantially the same time as the message is forwarded by the data control center, so no communication time is required for this (line 8 of Table 1). The terminal adds a final time stamp that includes the terminal elapsed time to the message and logs the time stamps in the message. In the final time stamp shown added to the message in line 5 of table 2, the letter T shows that the time stamp was added by the terminal, the number 13 indicates that the terminal elapsed time was 13 seconds, which is the total time required by the transaction authorization network to process the transaction. The letters rd in the final time stamp confirms that the return message received by the terminal 1 includes the erroneous "authorization denied" code introduced by the data control center or in the data link between the issuer and the data control center.

Line 6 of table 2 shows the contents of the log in the point-of-sale terminal 1 relating to the transaction serial number 1234. In addition to the time stamps received by the terminal in the return message, the log additionally includes the terminal time stamp data for the message that the terminal 1 logged at about the time it transmitted the message, and the final time stamp (T13rd). The logged terminal time stamp data is the transaction serial number (1234) and the origination time (10:00:00).

The logged data produced by the second embodiment shows that the computer elapsed time of the data control center 11 is 11 seconds. Of this 11 seconds, three seconds are accounted for by the computer elapsed time of the computer of the issuer 21, as shown by the computer time stamp added by that computer (line 3). However, the data gives no indication of how many of the remaining eight seconds were required for the data control center to forward the message to the computer of the issuer 21, and how many of the remaining eight seconds were required for the data control center to forward the message to the point-of-sale terminal 1.

The point-of-sale terminal 1 receives a command from a computer in the transaction authorization network from time-to-time to upload the contents of its log for analysis. In the following example, the data from the terminal has been uploaded to the computer of the issuer 21 for analysis. The issuer's computer analyzes data from a plurality of point-of-sale terminals to identify those messages that are delayed, lost, or have errors to identify the parts of the network that cause the service provided by the network to fall below required performance standards. This information enables corrective action to be taken to remedy defects found. Such action can include shortening and/or improving communications paths, correcting software errors, adding communications and computer capacity, substituting dedicated communications link for dial-up links.

Table 3 shows an example of part of a typical data log produced by a service quality monitoring system according to the second embodiment of the invention:

| | Uploaded Time Stamps from Terminal Log | | | |
|---|---|---|---|---|
| Trans. No. | Orig. Time | Time Data | Terminal Status | Issuer Status |
| 1. 1234 | 10:00:00 | T60n | No response | None |
| 2. 1234 | 10:01:00 | I3ia + D11fa + T13ra | Approved | Approved |
| 3. 1245 | 10:17:00 | D10ic + T15rc | Call me | Approved |
| 4. 1236 | 10:20:00 | T45x | Cancelled | Approved |
| 5. 1236 | 10:22:17 | I4ia + D8fa + T11rd | Denied | Approved |

In table 3, each letter-number-letter triplet is a time stamp, as described above. In the example shown in Table 3, the data in the "issuer status" column is logged by the issuer's computer. The issuer's computer links the transaction serial numbers to combine the data uploaded from the point-of-sale terminal 1 with its own log of transaction authorizations. This forms a more complete picture of the performance of the transaction authorization network than simply analyzing the data uploaded from the terminal 1 alone. From the combined data, the issuer can determine the following:

The transaction with serial number 1234 did not reach the issuer on the first attempt. There is no issuer status information in line 1 of the table. The only time stamp in line 1 is the final time stamp in which the letter T indicates that it was added by the point-of-sale terminal 1, and the letter n indicates that the point-of-sale terminal received no response and cancelled the request for authorization after waiting for its predetermined time-out time. The number 60 is the terminal elapsed time, which is equal to the time-out time of 60 seconds. A terminal that logs a terminal transit time in addition to the terminal elapsed time would have been able to provide data showing whether the lack of response to the request for authorization was because the terminal was unable to transmit its message to the data control center, or because of a fault elsewhere in the transaction authorization network. Alternatively, the terminal could log an action code indicating that it was unable to establish communication with the data control center.

Line 2 of table 3 shows that the transaction with serial number 1234 was re-entered. The final time stamp indicates that the point-of-sale terminal received a "transaction approved" code (the letters ra) after a terminal elapsed time of 13 seconds (the number 13). In the first computer time stamp in line 2, the letter I indicates that the time stamp was added by the computer of the issuer, the number 3 indicates that the computer elasped time was 3 seconds, and the letters ia indicate that a "transaction approved" code was issued. In the second computer time stamp in line 2, the letter D shows that it was added by the data control center, the number 11 shows that the computer elasped time was 11 seconds, and the letters fa indicate that the data control center forwarded a "transaction approved" code to the point-of-sale terminal.

In line 3, the time stamps for the transaction with serial number 1235 include no issuer time stamp, i.e., a time stamp starting with the letter I. The issuer log shows that the issuer granted authorization of the transaction. In the first computer time stamp, the letter D indicates that it was added by the data control center, the number 10 indicates that the computer elasped time was 10 seconds. The letters ic inidcate that, after 10 seconds had elapsed without it receiving a response from the issuer, the data control center issued a "call me" message, and transmitted it to the point-of-sale terminal. In the final time stamp, the number 15 shows the terminal elapsed time of 15 seconds, and the letters rc indicate that the point-of-sale terminal 1 received the return message including a "call me" code. This log entry indicates that the message reached the issuer, but was delayed at the issuer, or was lost or delayed between the computer of the issuer 21 and the data control center 11.

In line 4, the issuer log shows that the transaction with serial number 1236 was approved by the issuer. However, the terminal log for the message 1236 includes only the final time stamp in which the number 45 indicates a terminal elapsed time of 45 seconds and the letter x indicates that the merchant cancelled the request for authoriztion. The log entry for this message indicates that the return message authorizing the transaction was lost between the data control center 11 and the point-of-sale terminal 1. If the message had been lost between the computer of the issuer 21 and the data control center, the data control center would have provided a response to the terminal (e.g., a "call me" code as in line 3) after failing to receive the message from the issuer within its time-out time.

Line 5 shows that the merchant re-entered the request about two minutes later. In the final time stamp, the number 11 indicates that a response was received in 11 seconds. In the first computer time stamp in line 5, the letter I shows that it was added to the message by the computer of the issuer 21, and the letters ia indicate that the issuer approved the transaction. In the second computer time stamp, the letter D indicates that it was added by the data control center 11, the number 8 shows that the computer elapsed time was 8 seconds, and the letters fa indicate that the data control center forwarded the "transaction approved" message to the point-of-sale termianl 1. In the final time stamp in line 5, the number 11 shows that the terminal elapsed time was 11 seconds, and the letters rd indicate that the point-of-sale terminal received a "authorization denied" code. The difference between the action codes between the third computer time stamp and the final time stamp indicates that an error occured between the data control center and the point-of-sale terminal.

The third embodiment of the service quality monitoring system according to the invention gathers additional data to provide an even moer precise picture of the quality of service provided by the transaction authorization network. The third embodiment can indicate how much of the data control center's computer elapsed time is required for the data control center to forward the message to the computer of the issuer 21, and how much of the data control center's computer elapsed time is required for the data control center to forward the message to the point-of-sale terminal 1. This more precise picture is obtained at the expense of adding an additional overhead of time stamp data to the message, however.

In the third embodiment of the invention, each computer, or selected computers, in the transaction authorization network adds a computer time stamp to each message each time the message passes through the computer. Thus, each computer in the network except the computer of the issuer 21 adds two computer time stamps to the message, a first when the message is travelling from the point-of-sale terminal 1 to the computer of the issuer, and a second when the message is travelling from the computer of the issuer to the point-of-sale terminal. The computer time stamps are similar to those of the second embodiment, except that instead of including the computer elapsed time, each computer time stamp includes the computer transit time.

The computer transit time is the time that elapses between the time at which the computer receives the message from the previous node in the network and the time at which the computer passes the message on to the next node in the network. For example, if the data control center 11 receives a message from the point-of-sale terminal 1 at 10:00:00 hrs, but does not determine the issuer 21 of the payment card until 10:00:07, then immediately attempts to transmit the message to the issuer 21, but the issuer's computer is busy and does not give the go-ahead to transmit the message until 10:00:10, the computer transit time is 10 seconds.

If even more data regarding the performance of the individual components of the transaction authorization network is desired, the computer time stamp can include additional time data, at the expense of even more time stamp overhead in the message. For instance, the computer transit time can be broken down into processing time, which is the time required by the computer to process the message, and communication time, which is the time required to transmit the processed message to the next node in the network, as shown in Table 1.

In the third embodiment, the point-of-sale terminal 1 preferably is the same as the point-of-sale terminal in the second embodiment. The terminal generates and logs terminal time stamp data, logs the time stamps in the return message, measures and logs the terminal elapsed time, adds a final time stamp to the return message, and uploads its logged data. In the third embodiment, the terminal has to log more data for a given number of messages, however. The terminal in the third embodiment preferably measures both the terminal transit time and the terminal elapsed time. Measuring one of these times can be omitted, since the omitted time can be calculated from the other times measured or logged by the terminal. However, measuring both the terminal transit time and the terminal elapsed time provides a useful cross-check on the accuracy of the system.

Several variations on the point-of-sale terminal 1 are possible under the third embodiment of the invention. In a first variation, the point-of-sale terminal 1 generates terminal time stamp data including the origination time, the terminal transit time, and the transaction serial number. The terminal 1 logs the transaction serial number, and adds the origination time, the terminal transit time, and the transaction serial number to the message as the terminal time stamp.

In a second alternative, a simple point-of-sale terminal 1 that deals with only one message at a time adds no terminal time stamp to the message when it transmits the message. Instead, the terminal logs terminal time stamp data that includes the origination time. When the terminal receives the return message, it logs the time stamps in the return message such that they can be readily linked with the already-logged terminal time stamp data for that message. Since the terminal deals with only one message at a time, there is no ambiguity as to which message the return message relates to. However, in this alternative, the lack of a message identifier, such as the transaction serial number, in the message prevents the log from such a terminal from being correlated with the logs from other nodes in the transaction authorization network.

Known data compression techniques may be used to reduce the number of bits needed to transmit and store the time stamps. Checksum data may be added to each time stamp and/or to the set of time stamps or other error correction codes may be used to ensure data integrity. Techniques for generating the terminal time stamp data, the terminal time stamp, and the computer time stamp, for adding time stamps to a message, and for logging and linking time stamps using hardware and/or using computer software routines are known and will not be discussed.

Transit times are preferably used because they do not require that sychronous clocks be established throughout the network. Alternatively, if the network has or can have synchronous clocks, suitable absolute times can be logged for the terminal time stamp data and the computer time data in the computer time stamps. Only one absolute time need be logged by each computer in the network, because the transmit time of one computer of the network is the receive time of the following computer. The terminal has to log two absolute times: the origination time and either the transmit time (if the computers log their transmit times) or the receive time (if the computers log their receive times). Logging absolute times is the same as measuring and logging transit times because a transit time can easily be calculated from two suitable absolute times when the logged data is analyzed.

Figure 4:
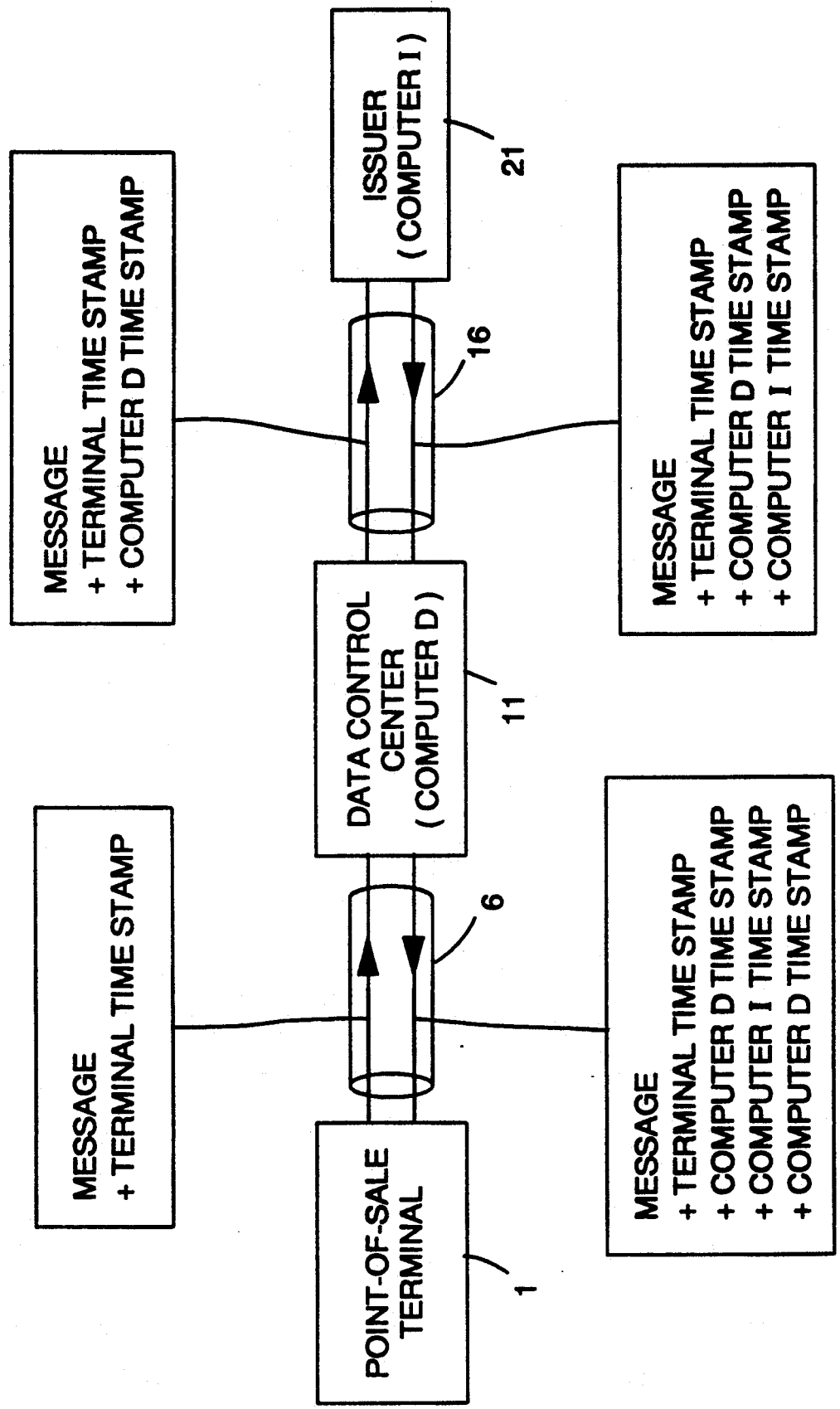
FIG. 4 is a block diagram of a simplified transaction authorization network to which the third embodiment the service quality monitoring system according to the invention has been applied showing the time stamps added to the message at various points on the path of the message through the network.

FIG. 4 shows how the third embodiment of the invention is applied to the simple transaction approval network shown in FIG. 1. The point-of-sale terminal 1 adds a terminal time stamp to the message and transmits the message including the terminal time stamp to the data control center 11. The data control center adds its "Computer D" time stamp to the message and forwards the message to the issuer 21. The message now includes two time stamps. The computer of the issuer processes the message, and transmits the processed message back to the data control center, adding its own "Computer I" time stamp to the message. The message now includes three time stamps. The data control center adds a second "Computer D" time stamp to the message and forwards the message to the point-of-sale terminal. The message now includes four time stamps. When the point-of-sale terminal receives the return message, it adds a final time stamp to the message and logs the time stamps in the return message.

The third embodiment of a service quality monitoring system according to the invention would add time stamps to the message shown in Table 1 as follows:

|  | Time Stamp Part of Message | |
|---|---|---|
| Node | Serial | Time Data |
| 1. Terminal 1 | 1234 | |
| 2. Data Ctr 11 | 1234 | D3fr |
| 3. Issuer 21 | 1234 | D3fr + I3ia |
| 4. Data Ctr 11 | 1234 | D3fr + I3ia + D5fd |
| 5. Terminal 1 | 1234 | D3fr + I3ia + D5fd + T13rd |
| 6. Terminal log | 1234 | 10:00:00 + 2 + D3fr + I3ia + |

| | Time Stamp Part of Message | |
|---|---|---|
| Node | Serial | Time Data |
| | | D5fd + T13rd |

In table 4, each letter-number-letter triplet is a time stamp. The first letter of the triplet indicates the node in the network that added the time stamp. The letter D denotes the data control center 11, the letter I denotes the computer of the issuer 21, and the letter T denotes the point-of-sale terminal 1. The number in the computer time stamps indicates the transit time in seconds; the number in the final time stamp indicates the terminal elapsed time in seconds. The second and subsequent letters of each triplet are the action code.

After the transaction has been entered into the point-of-sale terminal 1, the terminal generates and logs the terminal time stamp data, i.e., the transaction serial number (1234) and the origination time (10:00:00). The terminal adds the transaction serial number to the message as the terminal time stamp, as shown in line 1 of table 4. The terminal initiates communication with the data control center 11 and begins to measure the terminal transit time and the terminal elapsed time. After 2 seconds (the terminal transit time), the terminal transmits the message to the data control center, and logs the terminal transit time (2 seconds).

When the data control center 11 receives the message, it processes the message and forwards the message to the computer of the issuer 21. For the message shown in Table 1, this requires 3 seconds, 1 second of processing time and 2 seconds of communication time. As the data control center forwards the message, it adds its computer time stamp to the message, as shown in line 2 of table 4. In this time stamp, the letter D shows that the time stamp was added by the data control center 11, the number 3 shows that the computer transit time was 3 seconds, and the letters fa show that the data control center forwarded an authorization request.

The computer of the issuer 21 processes the message to decide whether or not to authorize the transaction and transmits the message indicating approval back to the data control center 11. For the message shown in Table 1, the computer transit time of the computer of the issuer is 3 seconds, 2 seconds of processing time, and 1 second of communication time. As it transmits the message, the computer of the issuer adds its computer time stamp to the message, as shown in line 3 of table 4. In this time stamp, the letter I indicates that the time stamp was added by the computer of the issuer, the number 3 indicates that the computer transit time was 3 seconds, and the letters ia show that a "transaction approved" code was issued.

The data control center 11 receives the message from the computer of the issuer 21 and forwards the message to the point-of-sale terminal 1. For the message shown in Table 1, the computer transit time for the data control center is 5 seconds, 1 second to process the message and 4 seconds of communication time. As it forwards the message, the data control center 11 adds a second time stamp to the message, as shown in line 4 of table 4. In this time stamp, the letter D shows that the time stamp was added by the data control center, the number 5 shows that the computer transit time was 5 seconds, and the letters fd indicate that an "authorization denied" code was forwarded. This code is different from the code issued by the computer of the issuer, which indicates that an error has occurred in the data control center 11 or in the communication link between the computer of the issuer and the data control center.

The point-of-sale terminal 1 receives the return message at substantially the same time as the message is forwarded by the data control center 11, so no communication time is required for this. The terminal adds a final time stamp that includes the terminal elapsed time to the message and logs the time stamps in the message, as shown on line 5 of table 4. In the final time stamp, the letter T indicates that the time stamp was added by the terminal, the number 13 indicates that the terminal elapsed time was 13 seconds, and the letters rd show that the return message received by the terminal 1 includes the erroneous "authorization denied" code.

Line 6 table 4 shows the contents of the log in the point-of-sale terminal 1 relating to the transaction serial number 1234. In addition to the time stamps received by the terminal from the data control center 11, the log additionally includes the origination time (10:00:00) and the terminal transit time (2 seconds) that the terminal 1 logged at about the time it transmitted the message, and the final time stamp (T13rd).

In the simple example just described, the third embodiment adds just one more time stamp to the message than the second embodiment. In the more typical transaction authorization network shown in FIG. 2, if all computers in the network add a time stamp, the point-of-sale terminal 1 receives the return message with 8 time stamps in the second embodiment, but the terminal receives the return message with 15 time stamps in the third embodiment.

The point-of-sale terminal 1 of the third embodiment of the service quality monitoring system according to the invention uploads its logged data to another node in the transaction authorization network for analysis in the same way as the terminal in the other two embodiments. Analysis of the uploaded data in the third embodiment is similar to that described for the second embodiment, and will not be separately described.

Although the main purpose of the service quality monitoring system that is the subject of this invention is to determine the quality of service provided by the transaction authorization network from the point of view of the point of sale, the time stamps in the messages can be additionally logged at other nodes of the network. As shown in the log analysis example set forth above, combining the log from the point-of-sale terminal with logs from other nodes of the network enables the point in the network causing lost or erroneous messages to be determined.

I claim:

1. In a transaction authorization network including a point-of-sale terminal and a central computer, wherein the point-of-sale terminal transmits a message regarding a transaction to the central computer, and the central computer processes the message and transmits the message after processing back to the point-of-sale terminal, a system for monitoring the quality of service provided by the transaction authorization network, comprising:
    means in the point-of-sale terminal for measuring the terminal elapsed time, the terminal elapsed time being the time that elapses between the origination time of the message and the time at which the point-of-sale terminal receives the message,
    means in the central computer for adding message monitoring data to the message, the message monitoring data becoming part of the message,
    means in the point-of-sale terminal for logging the message monitoring data in the message received by the point-of-sale terminal, and
    means in the point-of-sale terminal for logging the terminal elapsed time.

2. The quality monitoring system of claim 1, wherein the message monitoring data added to the message by the means in the central computer for adding message monitoring data to the message includes the computer elapsed time, the computer elapsed time being the time that elapses between the time at which the central computer receives the message from the point-of-sale terminal and the time at which the central computer transmits the message back to the point-of-sale terminal.

3. The quality monitoring system of claim 2, wherein the message monitoring data additionally includes computer identity data.

4. The quality monitoring system of claim 2, wherein the message monitoring data additionally includes a computer action code.

5. The quality monitoring system of claim 1, further comprising:
    means in the point-of-sale terminal for generating terminal message monitoring data for the message, and
    means in the point-of-sale terminal for logging at least part of the terminal message monitoring data.

6. The quality monitoring system of claim 5, wherein the terminal message monitoring data includes a transaction serial number and the origination time, and
    the means in the point-of-sale terminal for logging at least part of the terminal message monitoring data logs the transaction serial number and the origination time.

7. The quality monitoring system of claim 6, further comprising means in the point-of-sale terminal for adding at least part of the terminal message monitoring data to the message as message monitoring data, the message monitoring data becoming part of the message, the at least part of the terminal message monitoring data added to the message including the transaction serial number.

8. The quality monitoring system of claim 5, wherein the means in the point-of-sale terminal for logging the message monitoring data in the message logs the message monitoring data in the message such that it can readily be linked to the at least part of the terminal message monitoring data logged for the message.

9. The quality monitoring system of claim 5, further comprising means in the point-of-sale terminal for adding at least part of the terminal message monitoring data to the message as message monitoring data, the message monitoring data becoming part of the message.

10. The quality monitoring system of claim 9, wherein
    the terminal message monitoring data includes a transaction serial number, and
    the means in the point-of-sale terminal for adding at least part of the terminal message monitoring data to the message as message monitoring data adds the transaction serial number to the message.

11. The quality monitoring system of claim 5, further comprising terminal uploading means in the point-of-sale terminal for uploading the logged message monitoring data, the logged terminal elapsed time, and the logged terminal message monitoring data.

12. The quality monitoring system of claim 11, wherein
the terminal uploading means uploads the logged message monitoring data, the logged terminal elapsed time, and the logged terminal message monitoring data to the central computer, and
the system further comprises
means in the central computer for logging message monitoring data in the message,
means in the central computer for linking the message monitoring data logged by the central computer with the logged message monitoring data, the logged terminal elapsed time and the logged terminal message monitoring data uploaded by the terminal uploading means.

13. The quality monitoring system of claim 1, wherein
the transaction authorization network further includes an additional computer disposed between the point-of-sale terminal and the central computer, the point-of-sale terminal transmits a message regarding a transaction to the additional computer, the additional computer transmits the message to the central computer, the central computer processes the message and transmits the processed message back to the additional computer, and the additional computer transmits the message back to the point-of-sale terminal, and
the system further comprises means in the additional computer for adding message monitoring data to the message, the message monitoring data becoming part of the message.

14. The quality monitoring system of claim 13, wherein the means in the additional computer for adding message monitoring data to the message adds message monitoring data to the message that the additional computer receives from the point-of-sale terminal.

15. The quality monitoring system of claim 14, wherein the message monitoring data added to the message by the means in the additional computer for adding message monitoring data to the message includes the computer transit time, the computer transit time being the time that elapses between the time at which the additional computer receives the message from the point-of-sale terminal, and the time at which the additional computer transmits the message to the central computer.

16. The quality monitoring system of claim 15 wherein
the terminal message monitoring data includes the terminal transit time, the terminal transit time being the time that elapses between the origination time and the time at which the point-of-sale terminal transmits the message, and
the means in the point-of-sale terminal for logging at least part of the terminal message monitoring data logs the terminal transit time.

17. The quality monitoring system of claim 13 wherein the means in the additional computer for adding message monitoring data to the message adds message monitoring data to the message that the additional computer receives from the central computer.

18. The quality monitoring system of claim 17, wherein the message monitoring data added to the message by the means in the additional computer for adding message monitoring data to the message includes the computer elapsed time, the computer elapsed time being the time that elapses between the time at which the additional computer receives the message from the point-of-sale terminal, and the time at which the additional computer transmits the message back to the point-of-sale terminal.

19. The quality monitoring system of claim 17, wherein the message monitoring data added to the message by the means in the additional computer for adding message monitoring data to the message includes the computer transit time, the computer transit time being the time that elapses between the time at which the additional computer receives the message from the central computer, and the time at which the additional computer transmits the message to the point-of-sale terminal.

20. The quality monitoring system of claim 13, wherein the message monitoring data added to the message by the means in the additional computer for adding message monitoring data to the message includes computer identity data.

21. The quality monitoring system of claim 13, wherein the message monitoring data added to the message by the means in the additional computer for adding message monitoring data to the message includes a computer action code.

22. The quality monitoring system of claims 1 or 13, further comprising terminal uploading means in the point-of-sale terminal for uploading the logged message monitoring data and the logged terminal elapsed time.

23. The quality monitoring system of claim 22, wherein
the terminal uploading means uploads the logged message monitoring data and the logged terminal elapsed time to the central computer, and
the system further comprises
means in the central computer for logging message monitoring data in the message,
means in the central computer for linking the message monitoring data logged by the central computer with the logged message monitoring data and the logged terminal elapsed time uploaded by the terminal uploading means.

24. The quality monitoring system of claims 1 or 13, additionally comprising means in the point-of-sale terminal for adding message monitoring data to the message received by the point-of-sale terminal.

25. The quality monitoring system of claim 24, wherein the message monitoring data added to the message by the means in the point-of-sale terminal for adding message monitoring data to the message received by the point-of-sale terminal includes an action code.

26. The quality monitoring system of claim 25, further comprising:
terminal uploading means in the point-of-sale terminal for uploading the logged message monitoring data and the logged terminal elapsed time to the central computer,
means in the central computer for logging message monitoring data in the message,
means in the central computer for linking the message monitoring data logged by the central computer with the logged message monitoring data and the logged terminal elapsed time uploaded by the terminal uploading means, whereby errors in the message received by the point-of-sale terminal may be detected.

27. In a transaction authorization network including a point-of-sale terminal and a central computer, wherein the point-of-sale terminal transmits a message regarding a transaction to the central computer, and the central computer processes the message and transmits the message back after processing to the point-of-sale terminal, a system for monitoring the quality of service provided by the transaction authorization network, comprising:

in the point-of-sale terminal means for measuring the terminal elapsed time, the terminal elapsed time being the time that elapses between the origination time of the message and the time at which the point-of-sale terminal receives the message from the central computer, the origination time being the time at which the point-of-sale terminal begins to establish communication with the central computer, means for generating terminal message monitoring data for each message, the terminal message monitoring data including a transaction serial number and the origination time, means for logging at least part of the terminal message monitoring data, the at least part of the terminal message monitoring data including the transaction serial number and the origination time, means for adding at least part of the terminal message monitoring data to the message as message monitoring data, the message monitoring data becoming part of the message, the at least part of the terminal message monitoring data added to the message including the transaction serial number, means in the central computer for adding message monitoring data to the message, the message monitoring data becoming part of the message, the message monitoring data including the computer elapsed time, the computer elapsed time being the time that elapses between the time at which the central computer receives the message from the point-of-sale terminal and the time at which the central computer transmits the processed message back to the point-of-sale terminal, computer identity data, and a computer action code, and in the point-of-sale terminal means for adding message monitoring data to the message received by the point-of-sale terminal, the message monitoring data including an action code, means for logging the message monitoring data in the message received by the point-of-sale terminal, means for logging the terminal elapsed time for the message, and terminal uploading means for uploading the logged message monitoring data, the logged terminal elapsed time, and the logged terminal message monitoring data.

28. The quality monitoring system of claim 27, wherein the terminal uploading means uploads the logged message monitoring data, the logged terminal elapsed time, and the logged terminal message monitoring data to the central computer, and the system further comprises means in the central computer for logging message monitoring data in the message, means in the central computer for linking the message monitoring data logged by the central computer with the logged message monitoring data, the logged terminal elapsed time, and the logged terminal message monitoring data uploaded by the terminal uploading means, whereby errors in the message received by the point-of-sale terminal may be detected.

29. A point-of-sale terminal for use in a transaction authorization network including a central computer, the point-of-sale terminal comprising:

means for entering a transaction, means for transmitting a message regarding the transaction to the central computer and for receiving a return message regarding the transaction from the central computer, means for measuring the terminal elapsed time of the message, the terminal elapsed time being the time that elapses between the origination time of the message and the time at which the means for transmitting a message regarding the transaction to the central computer and for receiving a return message regarding the transaction from the central computer receives the return message, and means for logging the terminal elapsed time.

30. The point-of-sale terminal of claim 29, additionally comprising means for logging the origination time of the message, the origination time of the message being logged such that the origination time can readily be linked to the terminal elapsed time of the message.

31. The point-of-sale terminal of claim 30, additionally comprising:

means for generating a message identifier for the message, and means for logging the message identifier such that the message identifier can readily be linked to the terminal elapsed time of the message.

32. The point-of-sale terminal of claim 31, wherein the message identifier is the transaction serial number.

33. The point-of-sale terminal of claim 29, further comprising:

means for generating a message identifier for the message, and means for logging the message identifier such that the message identifier can readily be linked to the terminal elapsed time of the message.

34. The point-of-sale terminal of claim 33, wherein the message identifier is the transaction serial number, and the means for generating the message identifier generates the same message identifier for messages regarding the same transaction.

35. The point-of-sale terminal of claim 29, additionally comprising means for generating a message identifier, and means for adding the message identifier to the message, the message identifier becoming part of the message.

36. The point-of-sale terminal of claim 29, further comprising means for logging the authorization status data included in the return message, the authorization status data being logged such that it can readily be linked to the terminal elapsed time of the message.

37. The point-of-sale terminal of claim 36, additionally comprising means for uploading the logged authorization status data.

38. The point-of-sale terminal of claim 29 wherein
the origination time is the time at which the means for transmitting a message regarding the transaction to the central computer and for receiving a return message regarding the transaction from the central computer begins to establish communication with the central computer, and
the point-of-sale terminal further comprises:
means for measuring the terminal transit time of the message, the terminal transit time being the time that elapses between the origination time of the message and the time at which the means for transmitting a message regarding the transaction to the central computer and for receiving a return message regarding the transaction from the central computer transmits the message,
means for logging the terminal transit time such that the terminal transit time can readily be linked to the terminal elapsed time of the message.

39. The point-of-sale terminal of claim 29, additionally comprising uploading means for uploading the logged terminal elapsed time.

40. The point-of-sale terminal of claim 39, wherein
the means for transmitting a message regarding the transaction to the central computer and for receiving a return message regarding the transaction from the central computer is additionally for receiving a control signal, and
the uploading means is for uploading the logged terminal elapsed time in response to the control signal.

41. A point-of-sale terminal for use in a transaction authorization network including a central computer that receives and transmits messages, and adds message monitoring data to the messages that it transmits, the terminal comprising:
means for entering a transaction,
means for transmitting a message regarding the transaction to the central computer and for receiving a return message, including message monitoring data, regarding the transaction back from the central computer,
means for measuring the terminal elapsed time, the terminal elapsed time being the time that elapses between the origination time of the message and the time at which the means for transmitting a message regarding the transaction to the central computer and for receiving a return message, including message monitoring data, regarding the transaction back from the central computer receives the return message,
means for logging the message monitoring data in the return message, and
means for logging the terminal elapsed time.

42. The point-of-sale terminal of claim 41, further comprising:
means for generating terminal message monitoring data for each message, and
means for logging at least part of the terminal message monitoring data.

43. The point-of-sale terminal of claim of claim 42, wherein
the terminal message monitoring data includes a transaction serial number and the origination time, and
the means in the point-of-sale terminal for logging at least part of the terminal message monitoring data logs the transaction serial number and the origination time.

44. The point-of-sale terminal of claim 43, further comprising means for adding at least part of the terminal message monitoring data to the message as message monitoring data, the message monitoring data becoming part of the message, the at least part of the terminal message monitoring data added to the message including the transaction serial number.

45. The point-of-sale terminal of claim 41, wherein
the means for logging the message monitoring data in the return message logs the message monitoring data in the return message such that the message monitoring data in the return message can readily be linked to the at least part of the terminal message monitoring data logged for the message.

46. The point-of-sale terminal of claim 42, further comprising means for adding at least part of the terminal message monitoring data to the message as message monitoring data, the message monitoring data becoming part of the message.

47. The point-of-sale terminal of claim 46, further comprising means for uploading the logged message monitoring data, the logged terminal elapsed time, and the logged at least part of the terminal message monitoring data.

48. The point-of-sale terminal of claim 46, wherein
the terminal message monitoring data includes a transaction serial number, and
the means for adding at least part of the terminal message monitoring data to the message as message monitoring data adds the transaction serial number to the message.

49. The point-of-sale terminal of claim 41, additionally comprising uploading means for uploading the logged message monitoring data.

50. The point-of-sale terminal of claim 49, wherein
the means for transmitting a message regarding the transaction to the central computer and for receiving a return message, including message monitoring data, regarding the transaction back from the central computer is additionally for receiving a control signal, and
the uploading means is for uploading the logged message monitoring data in response to the control signal.

51. The point-of-sale terminal of claim 49, wherein the uploading means is additionally for uploading the logged terminal elapsed time.

52. The point-of-sale terminal of claim 41, additionally comprising means for adding message monitoring data to the return message.

53. The point-of-sale terminal of claim 52, wherein the message monitoring data added to the return message includes an action code.

54. A method of monitoring the quality of service provided by a transaction authorization network including a point-of-sale terminal and a central computer, wherein the point-of-sale terminal transmits a message regarding a transaction to the central computer, and the central computer processes the message and transmits the message after processing back to the point-of-sale terminal, the method comprising:
measuring, in the point-of-sale terminal, the terminal elapsed time, the terminal elapsed time being the time that elapses between the origination time of the message and the time at which the point-of-sale terminal receives the message, and logging, in the point-of-sale terminal, the terminal elapsed time.

55. The quality monitoring method of claim 54, additionally comprising:
generating, in the point-of-sale terminal, a message identifier for the message, and
logging, in the point-of-sale terminal, the message identifier such that the message identifier can readily be linked to the terminal elapsed time.

56. The quality monitoring method of claim 55, wherein step of generating the message identifier includes generating a transaction serial number.

57. The quality monitoring method of claim 56, wherein the step of generating the transaction serial number includes generating the same transaction serial number for different messages regarding the same transaction.

58. The quality monitoring method of claims 56 or 57, further comprising adding, in the point-of-sale terminal, the transaction serial number to the message.

59. The quality monitoring method of claim 54, additionally comprising
generating, in the point-of-sale terminal, a message identifier for the message, and
adding, in the point-of-sale terminal, the message identifier to the message, the message identifier becoming part of the message.

60. The quality monitoring method of claim 59, additionally comprising logging, in the point-of-sale terminal, the generated message identifier such that the message identifier can readily be linked to the terminal elapsed time.

61. The quality monitoring method of claim 60, additionally comprising:
uploading the logged terminal elapsed time and the logged message identifier from the point-of-sale terminal to the central computer,
logging, in the central computer, the message identifier in the message,
linking the message identifier logged by the central computer with the logged terminal elapsed time and the logged message identifier uploaded from the point-of-sale terminal.

62. The quality monitoring method of claim 54, further comprising logging the authorization status data included in the message received from the central computer, the authorization status data being logged such that the authorization status data can readily be linked to the terminal elapsed time.

63. The quality monitoring method of claim 62, additionally comprising:
uploading the logged authorization status data from the point-of-sale terminal to the central computer,
logging, in the central computer, the message identifier in the message,
linking the message identifier logged by the central computer with the logged action status data from the point-of-sale terminal.

64. The quality monitoring method of claim 54, wherein
the origination time is the time at which the point-of-sale terminal begins to establish communication with the central computer, and
the method further comprises
measuring, in the point-of-sale terminal, the terminal transit time of the message, the terminal transit time being the time that elapses between the origination time of the message and the time at which the point-of-sale terminal transmits the message,
logging, in the point-of-sale terminal, the terminal transit time such that the terminal transit time can readily be linked to the terminal elapsed time.

65. The quality monitoring method of claim 54, additionally comprising uploading the logged terminal elapsed time from the point-of-sale terminal.

66. The quality monitoring method of claim 65, wherein the step of uploading the logged terminal elapsed time is carried out in response to a control signal received by the point-of-sale terminal.

67. A method of monitoring the quality of service provided by a transaction authorization network including a point-of-sale terminal and a central computer, wherein the point-of-sale terminal transmits a message regarding a transaction to the central computer, and the central computer processes the message and transmits the message after processing back to the point-of-sale terminal, the method comprising:
measuring, in the point-of-sale terminal, the terminal elapsed time, the terminal elapsed time being the time that elapses between the origination time of the message and the time at which the point-of-sale terminal receives the message,
adding, in the central computer, message monitoring data to the message, the message monitoring data becoming part of the message,
logging, in the point-of-sale terminal, the message monitoring data in the message received from the central computer, and
logging, in the point-of-sale terminal, the terminal elapsed time for the message.

68. The quality monitoring method of claim 67, wherein the step of adding, in the central computer, message monitoring data to the message includes adding the computer elapsed time to the message, the computer elapsed time being the time that elapses between the time at which the central computer receives the message from the point-of-sale terminal and the time at which the central computer transmits the processed message back to the point-of-sale terminal.

69. The quality monitoring method of claim 68, wherein the step of adding, in the central computer, message monitoring data to the message additionally includes adding computer identity data to the message.

70. The quality monitoring method of claim 68, wherein the step of adding, in the central computer, message monitoring data to the message additionally includes adding a computer action code to the message.

71. The quality monitoring method of claim 67, further comprising:
generating, in the point-of-sale terminal, terminal message monitoring data for each message, and
logging, in the point-of-sale terminal, at least part of the terminal message monitoring data.

72. The quality monitoring method of claim 71, wherein
the step of generating terminal message monitoring data includes generating a transaction serial number and the origination time of the message, and
the step of logging at least part of the terminal message monitoring data includes logging the transaction serial number and the origination time of the message.

73. The quality monitoring method of claim 72, further comprising adding, in the point-of-sale terminal, at least part of the terminal message monitoring data to the message as message monitoring data, the message monitoring data becoming part of the message, the step of adding at least part of the terminal message monitoring data to the message including adding the transaction serial number to the message.

74. The quality monitoring method of claim 71, wherein the step of logging, in the point-of-sale terminal, the message monitoring data in the message includes logging the message monitoring data in the message such that the message monitoring data in the message can readily be linked to the at least part of the terminal message monitoring data logged for the message.

75. The quality monitoring method of claim 71, further comprising adding, in the point-of-sale terminal, at least part of the terminal message monitoring data to the message as message monitoring data, the message monitoring data becoming part of the message.

76. The quality monitoring method of claim 75, wherein
the step of generating, in the point-of-sale terminal, terminal message monitoring data includes generating a transaction serial number, and
the step of adding, in the point-of-sale terminal, at least part of the terminal message monitoring data to the message as message monitoring data includes adding the transaction serial number to the message.

77. The quality monitoring method of claim 67, wherein
the transaction authorization network further includes an additional computer disposed between the point-of-sale terminal and the central computer, the point-of-sale terminal transmits a message regarding a transaction to the additional computer, the additional computer transmits the message to the central computer, the central computer processes the message and transmits the processed message back to the additional computer, and the additional computer transmits the message back to the point-of-sale terminal, and
the method additionally comprises adding, in the additional computer, message monitoring data to the message, the message monitoring data becoming part of the message.

78. The quality monitoring method of claim 77, wherein the step of adding, in the additional computer, message monitoring data to the message includes adding message monitoring data to the message that the additional computer receives from the point-of-sale terminal.

79. The quality monitoring method of claim 78, wherein the step of adding, in the additional computer, message monitoring data to the message includes adding the computer transit time to the message, the computer transit time being the time that elapses between the time at which the additional computer receives the message from the point-of-sale terminal, and the time at which the additional computer transmits the message to the central computer.

80. The quality monitoring method of claim 77, wherein the step of adding, in the additional computer, message monitoring data to the message includes adding message monitoring data to the message that the additional computer receives from the central computer.

81. The quality monitoring method of claim 80, wherein the step of adding, in the additional computer, message monitoring data to the message includes adding the computer elapsed time to the message, the computer elapsed time being the time that elapses between the time at which the additional computer receives the message from the point-of-sale terminal, and the time at which the additional computer transmits the message back to the point-of-sale terminal.

82. The quality monitoring method of claim 80, wherein the step of adding, in the additional computer, message monitoring data to the message includes adding the computer transit time to the message, the computer transit time being the time that elapses between the time at which the additional computer receives the message from the central computer, and the time at which the additional computer transmits the message to the point-of-sale terminal.

83. The quality monitoring method of claim 77, wherein the step of adding, in the additional computer, message monitoring data to the message includes adding computer identity data to the message.

84. The quality monitoring method of claim 77, wherein the step of adding, in the additional computer, message monitoring data to the message includes adding an action code to the message.

85. The quality monitoring method of claims 67 or 77, further comprising uploading, from the point-of-sale terminal, the logged message monitoring data and the logged terminal elapsed time.

86. The quality monitoring method of claim 85, wherein
the step of uploading, from the point-of-sale terminal, the logged message monitoring data and the logged terminal elapsed time includes uploading the logged message monitoring data and the logged terminal elapsed time to the central computer, and the method further comprises
logging, in the central computer, message monitoring data in the message, and
linking the message monitoring data logged in the central computer with the message monitoring data and the logged terminal elapsed time uploaded from the point-of-sale terminal.

87. The quality monitoring method of claims 67 or 77, additionally comprising adding, in the point-of-sale terminal, message monitoring data to the message received by the point-of-sale terminal.

88. The quality monitoring method of claim 87, wherein the step of adding, in the point-of-sale terminal, message monitoring data to the message received by the point-of-sale terminal includes adding an action code to the message received by the point-of-sale terminal.

89. The quality monitoring method of claim 88, further comprising:
uploading, from the point-of-sale terminal, the logged message monitoring data and the logged terminal elapsed time to the central computer,
logging, in the central computer, message monitoring data in the message, and
linking the message monitoring data logged in the central computer with the message monitoring data and the logged terminal elapsed time uploaded from the point-of-sale terminal.

* * * * *